United States Patent Office 3,441,603
Patented Apr. 29, 1969

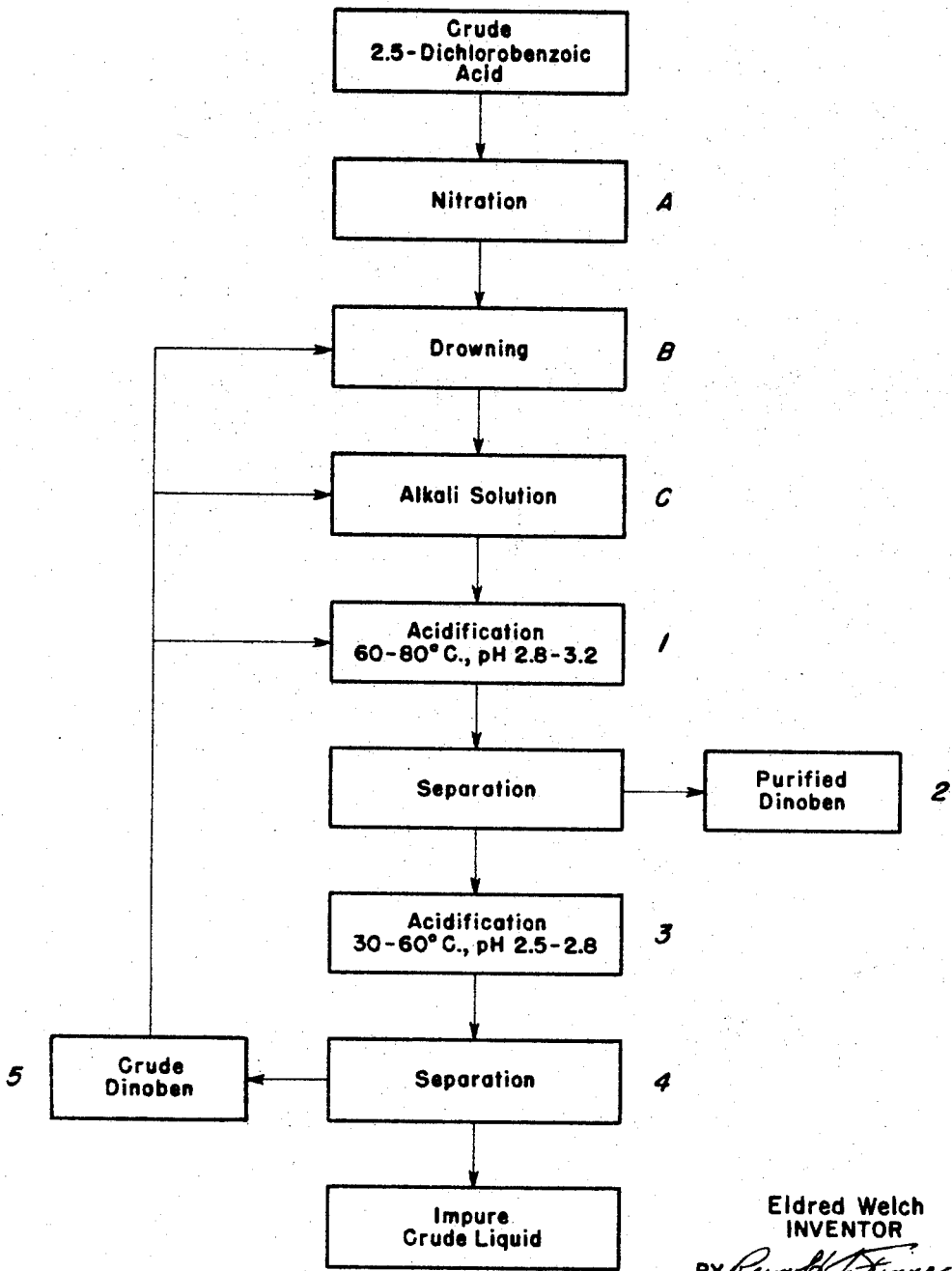

3,441,603
PROCESS FOR THE PURIFICATION OF CRUDE
2,5 - DICHLORO - 3 - NITROBENZOIC ACID
(DINOBEN)
Eldred Welch, Westfield, N.J., assignor to GAF
Corporation, a corporation of Delaware
Filed Mar. 3, 1966, Ser. No. 531,556
Int. Cl. C07c 51/42
U.S. Cl. 260—525                                                  4 Claims This present invention relates to a novel improved method for increasing the recovered yield of purified 2,5-dichloro-3-nitrobenzoic acid from its nitrated crude admixture.

This compound possesses outstanding herbicidal selectivity in that it may be employed as taught in U.S. Patent 3,013,873 for the eradication of both narrow and broadleaf weeds from economically desirable crops. Moreover, 2,5-dichloro-3-nitro benzoic acid (Dinoben) may also be used as an intermediate for the production of 3-amino-2,5-dichlorobenzoic acid, also a herbicide which is sold as a water soluble salt under the name of Amiben as is disclosed in U.S. Patent 3,014,063. Amiben is widely used especially as a preemergent weed killer in soybeans, snapbeans, tomatoes or squash and the like.

In the manufacture of both of these products it is important to keep the amount of certain highly phytotoxic impurities below definite low levels so that at the required application levels of the herbicides, crop damage is avoided. Some of these impurities are always present to greater or lesser extent as a result of one of the known commercial processes for preparing these compounds. 2,5-dichloro-3-nitrobenzoic acid is made most easily from the corresponding dichlorobenzoic acid, which in turn is made by the chlorination of benzoyl chloride followed by rectification and hydrolysis. The acid chloride can be hydrolyzed by any of the known methods to the acid. After hydrolysis the formed acid can be nitrated by any of the usual conventional methods described in U.S. Patent application Ser. No. 328,061, filed Dec. 4, 1963. The product formed by the nitration normally contains other compounds than the 2,5-dichloro-3-nitrobenzoic acid, for example, the 2,5-dichloro-6-nitrobenzoic acid isomer which is highly phytotoxic, 3,4-dichloro-6-nitrobenzoic acid, the nitro compounds derived from impurities, such as 2,3-dichlorobenzoic acid and unnitrated 2,5-dichlorobenzoic acid, in the starting material. Thus the product is quite crude and the use of technical grade 2,5-dichloro-3-nitrobenzoic acid obtained from a commercial nitration reaction such as hereinabove described, has produced erratic results, at times involving serious crop damage, when this technical grade of the herbicide acid was applied to soybeans, squash or snapbeans. Similar erratic results may be obtained when Amiben derived from this technical grade of Dinoben is used.

The use of pure 2,5-dichlorobenzoic acid such as could be obtained by effecting the purification at an early stage of the crude and less expensive 2,5-dichlorobenzoic acid derived from the chlorination of benzoyl chloride is not economically attractive. In this case, the purification of the corrosive mixture of chlorinated benzoyl chlorided by fractional distillation is quite difficult, isomeric dichlorobenzoyl chlorides and trichlorinated benzoyl chlorides in particular are difficult to separate because of the closeness of their boiling points. Purification of the corresponding benzoic acids by solvent crystallization, differences in solubility in water at various pH's, and other techniques tried, likewise proved quite difficult.

Attempts to separate the undesirable isomers, particularly the 6-nitro compound, from 2,5-dichloro-3-nitrobenzoic acid using standard methods of fractional crystallization, and/or solvent extractions have not been feasible on a commercial scale. Excessive costs mitigate against solvent extractions, while fractional crystallization techniques require involved, time-consuming operation. Moreover, although these techniques are relatively successful in ultimately separating the undesirable nitro isomers, they do not remove unnitrated benzoic acids, so that the latter constituents, even if not detrimental from a herbicidal use viewpoint, constitute essentially inert bulk and are undesirable for this reason.

It has been proposed to purify the crude Dinoben by solution of the crude mixture in water with an alkaline agent such as ammonium hydroxide, potassium hydroxide, or sodium hydroxide and the like, followed by precipitation at a pH of about 3 by the addition by a mineral acid, such as hydrochloric acid, sulfuric acid or phosphoric acid and the like to isolate the Dinoben compound which is precipitated and can be separated by filtration, centrifuging and the like.

However, in so doing, there is an inevitable yield loss due to the solubility of the desired product under the optimum conditions of the purification process. Pure Dinoben of melting point 221–222° C. and VPC purity of 99.87 mole percent has a solubility in water at pH 3.0 and 50° C. of 4 grams per liter and at 30° C. of 1.5 grams per liter. In commercial practice, considerable water at pH 3.0 and temperatures to 60–70° C. are required in the purification, resulting in appreciable yield loss. What is more, in the precipitation step, temperature and pH during the precipitation step are critical to the yield and quality of the product. Cooling down during the filtration and occlusion of impurities in the precipitation step all make the operation a very sensitive one if one is to obtain a biologically satisfactory product.

With the foregoing in mind, the principal object of the present invention is to increase the recovery of purified 2,5-dichloro-3-nitrobenzoic acid (Dinoben) recovered from its crude nitrated admixture by utilizing a batch or continuous process of purification.

Another object of this invention is to provide a process of obtaining 2,5-dichloro-3-nitrobenzoic acid of such high quality that it may be readily converted into Amiben having a biologically useable quality without further purification. Other objects of this invention will become more apparent as this disclosure proceeds.

I have now discovered that the above-mentioned difficulties may be overcome and nearly all of the desired Dinoben compound remaining in the liquor can be precipitated by lowering the temperature and pH further. In so doing, some impurities are also precipitated. However, if this impure recovered product is recycled into the drowning operation (Step B) of a finished nitration step or into the alkali solution (Step C) or into the initial acidification Step 1, the purified product obtained is of good quality and the recovery is considerably increased, up to 10% additional, or more, of the desired Dinoben being obtained.

This same procedure may be repeated using the liquor from the purification into which crude recovered product has been recycled to obtain another recovered product which can also be recycled into the drowning of a following nitration or into following solution or acidification steps. This procedure can be repeated indefinitely to give the increased recovery of the purified product. Moreover, this invention may be adapted to either batch or continuous processing or to a combination of the two.

For example, the method of purifying crude 2,5-dichloro-3-nitrobenzoic acid consists of dissolving the crude material with an alkaline agent, such as sodium hydroxide, potassium hydroxide or ammonium hydroxide and the like in enough water to make the concentration about 20%, adding a mineral acid such as hydrochloric acid, sulfuric acid, or phosphoric acid and the like at 60 to 80° C. until the pH is about 2.8–3.2, removing the precipitate (2,5-dichloro-3-nitrobenzoic acid) and washing out the mother liquor with hot water. The effective yield (recovery) of the product thus obtained by separating it from the liquid, such as by filtration or centrifuging, and the like, is about 66% from 2,5-dichlorobenzoyl chloride.

This yield (recovery) can be increased considerably without adversely affecting the quality of the product in the manner described below and exemplified in the attached sheet of drawings exemplifying a diagrammatic flow chart process and may briefly be described as follows:

2,5-dichlorobenzoic acid which may itself contain impurities is nitrated with mixed acid (Step A) and the crude nitration mixture drowned (Step B) in water. The crude nitrated product from the drowning step is dissolved in alkali solution (Step C) and acidified at a temperature of 60–80° C. and a pH of 2.8–3.2 (Step 1) to precipitate purified 2,5-dichloro-3-nitrobenzoic acid. It is obvious that Steps B and C may be combined into one step by using an aqueous alkali solution. The purified Dinoben is separated from the crude liquid containing impurities as well as unseparated Dinoben (Step 2). This crude liquid is acidified (Step 3) at 30–60° C. to a pH of about 2.5–2.8 (slightly lower range than in Step 1 above) to precipitate an impure grade of Dinoben. The crude liquor in a suitable separation step such as filtration or centrifuging, is separated (Step 4) from the precipitated impure Dinoben. The impure Dinoben is then returned (Step 5) to the initial acidification (Step 1) or to the prior drowning (Step B) or solution (Step C) of a subsequent run, in the case of batch operation, or of the same run in the case of continuous operation. In this way the yield (recovery) is increased up to 10% or more. A crude recovered product can be obtained from the liquors from this first recycling and then charged into another run. This recovery and recycling can be repeated for subsequent runs to maintain the increased yield.

The following examples are illustrative of the present invention and are not to be regarded as limitative. It is to be understood that all parts, percentages and proportions referred to herein and in the appended claims are by weight unless otherwise indicated.

EXAMPLE I

Into a suitable one liter flask were charged 1240 grams of 96% sulfuric acid, 260 grams of 2,5-dichlorobenzoyl chloride (63.5% by assay) were added. After the hydrolysis of the acid chloride was complete, there were added at 53–57° C. 280 grams of mixed acid (33% $HNO_3$ and 67% $H_2SO_4$), cooling externally as required. After agitating for one hour, the nitrated mass was drowned into about 5000 cc. water to precipitate the crude product. The precipitate was removed by filtration and washed nearly free of mineral acid with water.

The crude product containing 2,5-dichloro-3-nitrobenzoic acid was slurried in water and dissolved by adding sodium hydroxide solution. After diluting to a concentration of 20–25%, the temperature was adjusted to 65° C. and sulfuric acid added until the pH was 3. The purified 2,5-dichloro-3-nitrobenzoic acid product was removed by filtration and the cake washed with 500 cc. warm water. The yield of dry product was 66.3% by weight based on the 2,5-dichlorobenzoyl chloride. The melting point was 215.1–217.8° C.

The temperature of the liquor from the filtration of the purified product was adjusted to 35–45° C. and sulfuric acid added to readjust the pH to a pH of 2.5. The precipitate, impure 2,5-dichloro-3-nitrobenzoic acid, was removed by filtration and the filtrate discarded.

The nitration of Example I was repeated. However, before drowning the mass, the impure 2,5-dichloro-3-nitrobenzoic acid product just recovered from the purification liquors as outlined above was charged into the 5000 cc. of water. The above described procedural steps of Example I were then continued.

The yield of dry purified product was 72.9% effective, an increase of 8.9% over the initial precipitated, 2,5-dichloro-3-nitrobenzoic acid. The melting point was 215.7–218.4° C.

EXAMPLE II

The procedure of Example I was repeated a total of five times, each time charging the crude recovered product into the drowning step of the following operation, with results similar to that of Example I. Thus, there were a total of six recycle operations carried out.

The yield from the last operation was 73.2% by weight based on the 2,5-dichlorobenzoyl chloride, or 10.4% above that of the initial precipitated 2,5-dichloro-3-nitrobenzoic acid of Example I. The melting point was 214.5–216.2° C.

EXAMPLE III

The nitration procedure of Example I was repeated using a charge three times that given. The crude nitrated product was dissolved in water with sodium hydroxide and diluted to 3000 cc. This solution was divided into three equal parts. One part was acidified to a pH of 3 at 70° C., the precipitate, purified 2,5-dichloro-3-nitrobenzoic acid, removed by filtration and washed on the filter with 500 cc. warm water. The yield amounted to 66.4% by weight based on the 2,5-dichloro-benzoyl chloride.

A crude recovered product, impure 2,5-dichloro-3-nitrobenzoic acid obtained as described in Example I was added to another part of the dissolved crude nitrated product and dissolved with sodium hydroxide. After precipitation with sulfuric acid at 70° C. and pH 3, the purified 2,5-dichloro-3-nitrobenzoic acid product was removed and washed as above.

The yield was 69.6% by weight based on the 2,5-dichlorobenzoyl chloride, an increase of 7.6%. The melting point was 214.2–215.4° C.

This recovery and recycling of crude product was repeated several times with essentially the same results as obtained from the first recycle operation.

The foregoing method of purification is particularly effective for obtaining good recovery of high quality 2,5-dichloro-3-nitrobenzoic acid (Dinoben) which is particularly valuable for the direct production (by reduction) of 3-amino-2,5-dichlorobenzoic acid (Amiben) of a biologically acceptable quality without further purification. The procedure described above, however, does not remove from the Dinoben all of the 3,4-dichloro-6-nitrobenzoic acid. This impurity, however, is usually present in small amounts and a corresponding amine derived, thereof, is not objectionable in Amiben so that removal of N-nitro acid is ordinarily not justified unless the recovered Dinoben is to be used as such as a herbicide. If it is desired to remove the 3,4-dichloro-6-nitrobenzoic acid from the Dinoben produced in accordance with the present invention, such removal can be affected in a manner described in U.S. Patent 3,174,999 by dissolving the crude nitration mixture in aqueous alkali solution at a pH of at least 10 and separating any precipitate (largely the alkali metal salt of 3,4-dichloro-6-nitrobenzoic acid) therefrom. The purification can then proceed as described above. Alternatively, the small amount of 3,4-dichloro-6-nitrobenzoic acid remaining in the purified Dinoben obtained by the instant procedure described above may be removed from the final product by adding it to an aqueous alkali solution at a pH of at least 10 and then separating the precipitated alkali metal salt of 3,4-dichloro-6-nitrobenzoic acid therefrom. The alkali liquor containing the alkali metal salt of Dinoben, free of 3,4-dichloro-6-nitrobenzoic acid, may then be acidified to precipitate the 2,5-dichloro-3-nitrobenzoic acid (Dinoben). The thus highly purified Dinoben may then be of a biologically acceptable quality and may be used without further purification as a preemergent weed killer.

Various modifications and variations of this invention will be obvious modifications and variations of this invention will be obvious to a worker skilled in the art and it is understood that such modifications and variations are to be included within the purview of this application.

I claim:
1. In a process for purifying 2,5-dichloro-3-nitrobenzoic acid from a crude nitration admixture which consists essentially of nitrating 2,5-dichlorobenzoic acid, drowning the crude nitrated admixture with water, dissolving it in an alkaline hydroxide and precipitating the desired 2,5-dichloro-3-nitrobenzoic acid with a mineral acid the improvement which comprises the steps of (1) performing the acidification at a temperature of 60–80° C. and a pH of about 2.8–3.2; (2) separating and recovering the precipitated purified 2,5-dichloro-3-nitrobenzoic acid; (3) reacidifying the separated crude admixture at a temperature of 30–60° C. and a pH of about 2.5–2.8, with the proviso that the temperature and pH is lower than employed in Step 1; (4) separating precipitated impure 2,5-dichloro-3-nitrobenzoic acid and (5) recycling the impure precipitate to a point prior to the initial separating (Step 2) specified above.

2. The process according to claim 1, wherein the impure precipitate is recycled to the water used in the drowning of the initial crude nitrated admixture.

3. The process according to claim 1, wherein the impure precipitate is recycled to the acidification (Step 1).

4. The process according to claim 1, wherein the impure precipitate is recycled to the alkali solution used in dissolving the nitrated admixture.

References Cited

UNITED STATES PATENTS 3,174,999   3/1965   Raman _____ 260—525

BERNARD HELFIN, *Primary Examiner.*

U.S. Cl. X.R.

71—115